(12) United States Patent
Kolb et al.

(10) Patent No.: US 10,558,457 B1
(45) Date of Patent: Feb. 11, 2020

(54) PLATFORM DISCOVERY AND DEPLOYMENT AUTOMATION SYSTEM

(71) Applicant: Dais Technology, Inc., Glenview, IL (US)

(72) Inventors: Jason Kolb, Glenview, IL (US); Qamber Syed Mehdi, Glenview, IL (US)

(73) Assignee: Dais Technology, LLC, Chicago, IL (US)

( * ) Notice: Subject to any disclaimer, the term of this patent is extended or adjusted under 35 U.S.C. 154(b) by 0 days.

(21) Appl. No.: 16/111,824

(22) Filed: Aug. 24, 2018

(51) Int. Cl.
| | |
|---|---|
| *G06F 8/65* | (2018.01) |
| *G06F 8/71* | (2018.01) |
| *G06F 16/903* | (2019.01) |
| *G06F 11/30* | (2006.01) |

(52) U.S. Cl.
CPC .............. *G06F 8/71* (2013.01); *G06F 8/65* (2013.01); *G06F 11/3051* (2013.01); *G06F 16/903* (2019.01)

(58) Field of Classification Search
CPC ..................................... G06F 8/65; G06F 8/71
USPC ........................................................ 717/170
See application file for complete search history.

(56) References Cited

U.S. PATENT DOCUMENTS

| | | | | |
|---|---|---|---|---|
| 8,918,775 B1* | 12/2014 | Carpenter | ........... | G06F 9/44505 709/203 |
| 2006/0179116 A1* | 8/2006 | Speeter | ..................... | G06F 8/71 709/217 |
| 2013/0159326 A1* | 6/2013 | Kyomasu | .................. | G06F 8/61 707/754 |
| 2016/0092209 A1* | 3/2016 | Kuchibhotla | ............. | G06F 8/61 717/170 |
| 2017/0192873 A1* | 7/2017 | Ozdemir | ................. | G06F 8/658 |

OTHER PUBLICATIONS

"Manage and Deploy Private Images"; Docker.com website [full url in ref.]; Apr. 17, 2018 (Year: 2018).*
"Manage Sensitive Data with Docker Secrets"; Docker.com website [full url in ref.] as captured by the Wayback Machine Internet Archive (archive.org) on May 30, 2018 (Year: 2018).*
Rafael Benevides; "10 Things to Avoid in Docker Containers"; Red Hat website [full url in ref.]; Feb. 24, 2016 (Year: 2016).*
Lawrence Abrams; "How to install Software Updates on your Mac"; Bleeping Computer (.com) website [full url in ref.]; Aug. 7, 2012 (Year: 2012).*

* cited by examiner

*Primary Examiner* — Qing Chen
*Assistant Examiner* — Clint Thatcher
(74) *Attorney, Agent, or Firm* — Barnes & Thornburg LLP

(57) ABSTRACT

A platform discovery and deployment automation system is provided. The system discovers and/or monitors the current versions of all applications and services running in an environment. The system also deploys updates or new versions of the applications and services. The monitoring and the deployment are both done through a single interface. Methods and machine readable media are also provided.

19 Claims, 18 Drawing Sheets

A few seconds since last refresh

Refresh

Platform Discovery and Deployment Automation

400

| INT Environment | | | DEV Environment | | | | DEVELOP Environment | | | | ANSAY-DEV Environment | | |
|---|---|---|---|---|---|---|---|---|---|---|---|---|---|
| App Name | Current Version | Update Version | App Name | Current Version | Update Version | | App Name | Current Version | Update Version | | App Name | Current Version | Update Version |
| performance-management | 1.0.7 | Update version! | performance-management | 1.0.7 | Update version! | | performance-management | | Update version! | | performance-management | | Update version! |
| marketplace | 0.0.11 | Update version! | marketplace | 0.0.12 | Update version! | | marketplace | 0.0.11 | Update version! | | marketplace | 0.0.11 | Update version! |
| content-management | 1.5.2 | Update version! | content-management | 1.5.3 | Update version! | | content-management | | Update version! | | content-management | | Update version! |
| firehose-leads | 1.0.0 | Update version! | firehose-leads | 1.0.0 | Update version! | | firehose-leads | | Update version! | | firehose-leads | | Update version! |
| communication | 1.13.0 | Update version! | communication | 1.14.2 | Update version! | | communication | | Update version! | | communication | | Update version! |
| kpi | 1.0.3 | Update version! | kpi | | Update version! | | kpi | | Update version! | | kpi | | Update version! |

The latest version of performance-management on bravo is 1.3.37-master

600

Enter the version number you want to deploy:

What env was the docker container built in?
dev

Should the NewRelic Agent be added? ◯

This will only deploy to [bravo] ◀▶ [environment.] [Update]

[Back to Home]

FIG. 6

PLATFORM DISCOVERY AND DEPLOYMENT AUTOMATION SYSTEM

TECHNICAL FIELD

The present disclosure relates generally to an application updating system, and more specifically to a system for verifying currently deployed application versions and deploying application updates using a single interface.

BACKGROUND

The business world today requires the use of many different software applications by an operating entity, which has many inefficiencies involving verifying current version levels of currently deployed applications and updating applications with new releases and/or versions. For example, an operating entity may use 25 different applications, some developed internally and others procured from third party entities, each needing to be individually maintained. Conventional approaches are to write a script for interfacing with and updating each application individually. This results in inefficient tracking and updating of currently deployed application versions. Thus, labor intensive, less efficient and more expensive outcomes are experienced by everyone involved.

It is desired to provide a system with a single user interface that efficiently monitors version levels of deployed applications and updates the applications to new version levels when available.

The description provided in the background section should not be assumed to be prior art merely because it is mentioned in or associated with the background section. The background section may include information that describes one or more aspects of the subject technology.

SUMMARY

According to certain aspects of the present disclosure, a computer-implemented method for providing a platform discovery and deployment automation system is provided. In one or more embodiments, the method includes using one or more processors for identifying available platforms associated with a platform discovery and deployment system; determining if an application or service is running on a first available platform; determining a version field to be blank if no application or service is running on the first available platform; querying a version number associated with a first application or service if the first application or service is running on the first available platform; obtaining a version number value associated with the first application or service; storing the version number value in a version number database; displaying a single pane of glass interface; and displaying the version number value associated with a listing of the first application or service on the single pane of glass interface.

According to certain aspects of the present disclosure, a platform discovery and deployment automation system is provided. The system comprises a memory; and a processor configured to execute instructions which, when executed, cause the processor to identify available platforms associated with a platform discovery and deployment system; determine all applications and services running on all available platforms; query a version number associated with each determined application or service; obtain a version number value associated with the each determined application or service; store each version number value in a version number database; display a single pane of glass interface; and display, in the single pane of glass interface, listings of all determined applications and services, each listing including the application or service name, the current version number and an update button.

It is understood that other configurations of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4 illustrates a single pane of glass interface provided by one or more embodiments of a platform discovery and deployment automation system.

FIG. 6 illustrates an example application monitoring screen.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for monitoring application or service version information and deploying application/service updates for identified applications that are running or being utilized within multiple computer environments. For example, the system may have many different applications/services (e.g., accounting, shipping and receiving, sales, document production, word processing, graphic design, etc.) that are continually revised and updated. The system applications may be a combination of legacy applications (e.g., home grown application, highly customized third party application) and off the shelf third party applications, each running at a specific version level. Any of the applications may be provided as a service, such as a cloud based or virtual machine application, for example. For any given entity (e.g., clients, customers), the system provides all of the system applications/services or a subset of the system applications/services for use by the entity. The system may provide system applications/services to multiple entities, each entity using a specific combination of the system applications/services.

For each entity, the system monitors the version level of each system application/service being used by the entity (e.g., currently running in the company environment), and also monitors for any updates or new versions of the applications/services being used by the entity. The system also deploys the updates or new versions to each environment associated with the entity. For example, the system may have a development environment where the new updates and revisions are actually designed and coded, an alpha testing environment where the newly developed version is tested as to its interaction with the rest of the system applications/services, a beta testing environment where the new version is tested by customers, a staging environment where the beta tested version is readied for production release, and customer production environments where the finalized and tested new version is implemented to replace or update the current version.

Figure 5:
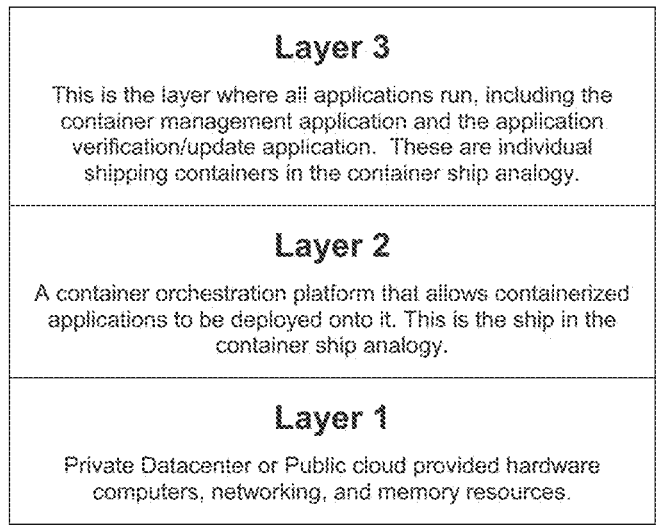
FIG. 5 illustrates an example application deployment screen.

In various embodiments, the overall system structure may resemble that of a layered cake (see FIG. 5). An example Enterprise System Architecture may resemble a three-layer cake having a base layer providing hardware computer resources such as a bare metal data center or provided by a $3^{rd}$ party cloud provider, such as AWS by Amazon. The next layer of the cake is a container orchestration platform that allows containerized applications to be deployed onto the platform. The container orchestration platform may be thought of as a container ship for storing cargo containers and/or transporting cargo containers from location to location. For example, the container orchestration platform may be a $3^{rd}$ party platform, such as Docker Enterprise Edition, Kubernetes, DC-OS or AWS ECS. A container management application provides a wrapper around the container orchestration platform so that application/service deployments may be performed. For example, a container management application may be proprietary programming or a $3^{rd}$ party application, such as Skopos by OPSANI. Continuing the container ship analogy, the container management application may be seen as the dock crew that receives and stacks shipping containers onto the container ship (e.g., the container orchestration platform).

The final or top layer in the cake is the application/service layer, which is where the applications and/or services run. In terms of the shipping container analogy, each application or service is contained in a separate wrapper as an individual shipping container. For example, a container application, such as Docker Open Source or proprietary programming may be used, which creates a container or wrapper around each application/service and provides for easily moving the applications/services around in a uniform way (e.g., uniform shipping containers). All applications/services have an individual container, including the platform discovery and automatic deployment application, the container management application, and each entity application (e.g., accounting, marketing, sales, shipping and receiving), for example. Thus, multiple proprietary applications may be hosted on the same server (e.g., bin stacking), where each application with its own source code repository is wrapped/contained within a separate container (e.g., Docker container).

A system interface (e.g., user interface) is also provided, having a single interface showing all of the applications/services and version numbers running in each of multiple environments. For example, this single interface may be thought of as a single pane of glass. In other words, a single window providing a view of all applications/services versions running in all associated environments, versus having to have a separate interface (e.g., window) for viewing each application/service.

In various embodiments, the system provides a structure to communicate with and query/monitor the current version of each and every application/service being used by an entity. In one or more aspects, the system may provide visibility into the version of the application/service that is currently running by querying each application/service directly. This provides for direct communications to/from the applications/services by the application monitoring/update application, thus not requiring the features of the container management application. For example, a user may select an application/service shown in the single pane of glass interface, to which the system directly queries the selected application/service as to what its current version number is. In one or more aspects, the system may also monitor the applications/services in an environment. For example, the system may proactively monitor the health of each application/service continuously or at predetermined time intervals. Here, the health of the application may be visually represented in the single pane of glass interface, such as using green/yellow/red coloring, for example. The system may also reactively monitor the health of an application, such as by querying an application/service after being selected by a user.

In various embodiments, the system provides a structure to deploy updated/new versions of applications/services to the applications/services currently run by an entity. This structure may be an application deployment application. Here, the application deployment application may integrate with the container management application to enact the deployment process. The deployment process may be managed through the single pane of glass interface. For example, each specific application/service may be shown on the single pane of glass, with each application/service listing having an associated update button. Thus, the subject system provide for identifying and deploying a new version of a specific application/service through the single pane of glass by activating or clicking on the update button. The subject system may in addition to or in place of, provide for identifying and deploying new versions of multiple applications/services (e.g., bin stack) by activating a single update button (e.g., update all). The container management application may pass in all related secrets at the time of deployment.

In various embodiments, a single provider entity may provide a variety of applications/services for use by multiple consuming entities. The subject system provides for the provider entity to develop, test and implement updates and/or new versions of all of the variety of applications/services available for use by the consuming entities. Here, each consuming entity has its own environment that includes all or a subset of the various applications/services. For example, a first consuming entity may have an environment that uses all of the various applications/services provided by the providing entity, while a second consuming entity may have an environment that uses a subset of the various applications/services provided by the providing entity. Thus, if a new version of a first application is developed by the providing entity, the new version may then be deployed to each consuming environment that uses that first application. Continuing the above example, if the first application was only used by the second consuming entity, but not the first consuming entity, then the new version of the first application would be deployed to the second consuming environment and not the first consuming environment.

The subject system offers numerous advantages over prior systems. For example, the subject system provides for monitoring of multiple application versions running within multiple environments. As another example, the subject system provides for deploying updates/new versions to any or all of the multiple application versions running within multiple environments. As yet another example, the subject system provides for the above version monitoring and update/new version deploying all through a single interface. The subject technology greatly decreases the time to market for new software features and bug fixes by making the entire organization much more efficient by an order of magnitude. Not only does the subject technology remove hurdles to software delivery, but it also makes the delivery much faster (e.g., minutes vs. hours) while requiring less human intervention and specialist expertise. For example, the expertise goes into coding the subject system as opposed to performing large and laborious coding tasks doing routine software releases. In addition, the subject technology vastly improves digital transformation using a single interface to track all software applications and services running in an entity (e.g., a company) to provide visibility into current version levels and rapid release of new or updated versions without friction, thus providing for extremely efficient collaboration using key digital transformation enablement. Software releases can be a highly technical process requiring specialized knowledge into a company's internal tools and operations. By utilizing the subject system, less sophisticated operators can perform the same software release functions, which removes friction and time to market of new software features, thus greatly increasing innovation and the rapid feedback loop most organizations find to be so elusive. Therefore, the subject system directly contributes to an organization's bottom line.

Example System Architecture

Architecturally, the subject technology can be deployed anywhere. For example, it may be preferable to operate on a very powerful server, in particular one with parallel processing capabilities. When used in the cloud, the system may be deployed with a central database, which may leverage a network of other servers to spread the load of the system. Users may access the system either via a webpage or via an application programming interface (API) implemented within the application verification and deployment system (e.g., a single pane of glass).

In one or more embodiments, the system may be deployed on a very powerful server, in particular one with parallel processing capabilities. Graphics cards may be used as optimizations for processing more operations in parallel. In one or more aspects, the generated workload may be optimally distributed across multiple different physical computers.

Figure 1:
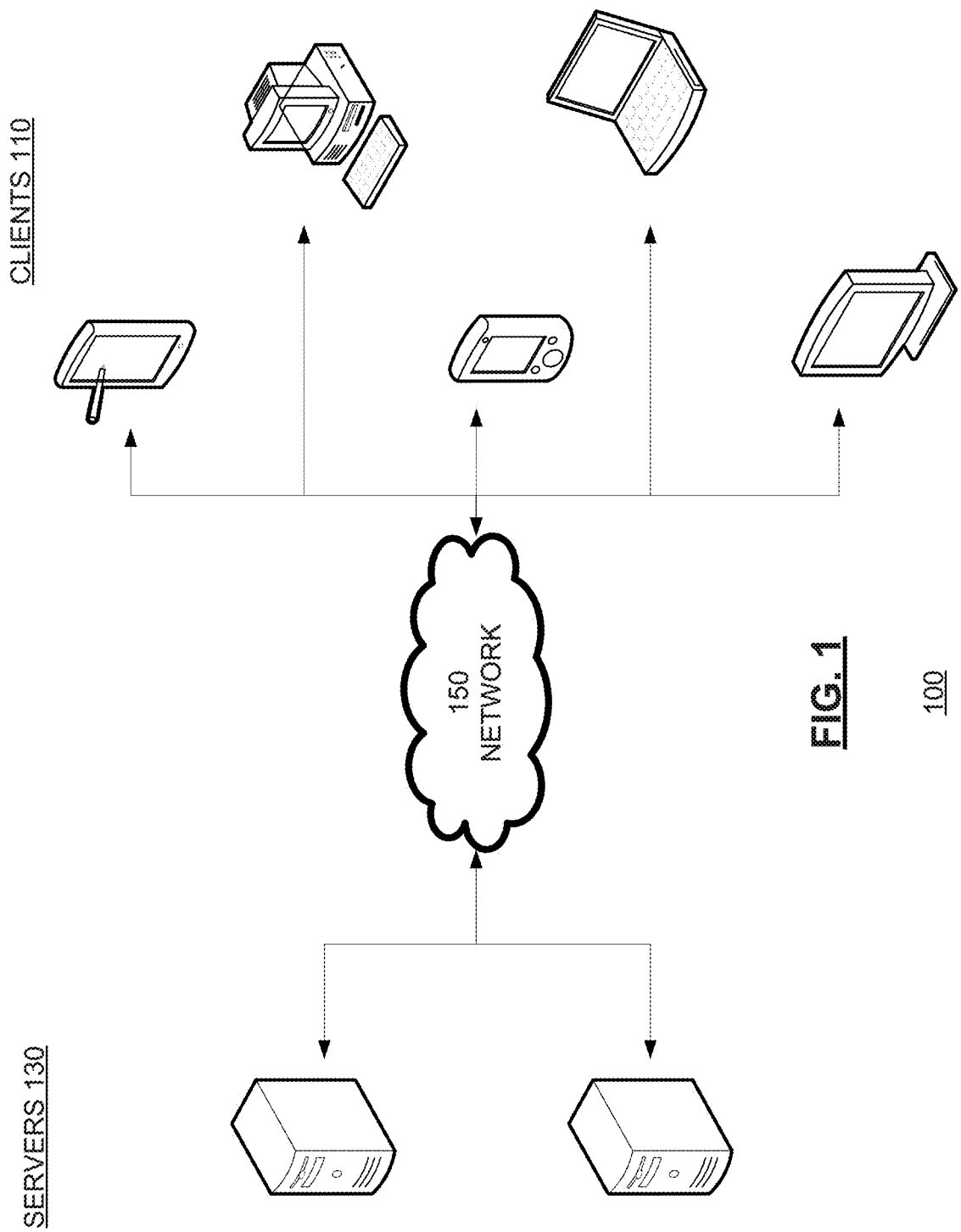
FIG. 1 illustrates an example architecture for providing a platform discovery and deployment automation system.

FIG. 1 illustrates an example architecture 100 for verifying currently deployed application versions and deploying application updates using a single interface. The architecture 100 includes servers 130 and clients 110 connected over a network 150.

The clients 110 can be, for example, desktop computers, mobile computers, tablet computers (e.g., including e-book readers), mobile devices (e.g., a smartphone or personal digital assistant), set top boxes (e.g., for a television), video game consoles, or any other devices having appropriate processor, memory, and communications capabilities for querying, storing and/or analyzing data. The system provides interconnection of any combination of servers 130 and clients 110 over the network 150, stores application version and application update related content on one or more databases on one or more servers 130, and deploys updates to applications in a given environment.

One or more of the many servers 130 are configured to analyze and/or process application content and store the analysis/processing results in a database. The database may include, for each application in the database, information on the relevance or version of the application content with regards to user input received from a client 110. The database on the servers 130 can be queried by clients 110 over the network 150. For purposes of load balancing, multiple servers 130 can host the database either individually or in portions.

The servers 130 can be any device having an appropriate processor, memory, and communications capability for hosting any portion of the above-described application verification and update deployment related applications and databases. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

In one or more embodiments, the system can be deployed on a distributed virtual machine and run by the network itself. In this case, for example, aspects of the application verification and updating system may be written to a blockchain and the network may execute various aspects of the operating system so that no single entity is in control of running the application verification and updating system. For example, a company may be running its own private blockchain, where the subject system updates an application/service to a new version and then publishes the update to the blockchain, thus providing a timestamped record of the version update that is publicly verified. In the case where a company is running Software as a Service platform on behalf of a paying customer, this blockchain can be used to verify and provide visibility into running services and applications for the customer's stakeholders. In some cases, the number of services and applications may number hundreds or thousands and the blockchain will help keep track of them while providing a single source of truth and trust.

Example Application Verification and Updating System

Figure 2:
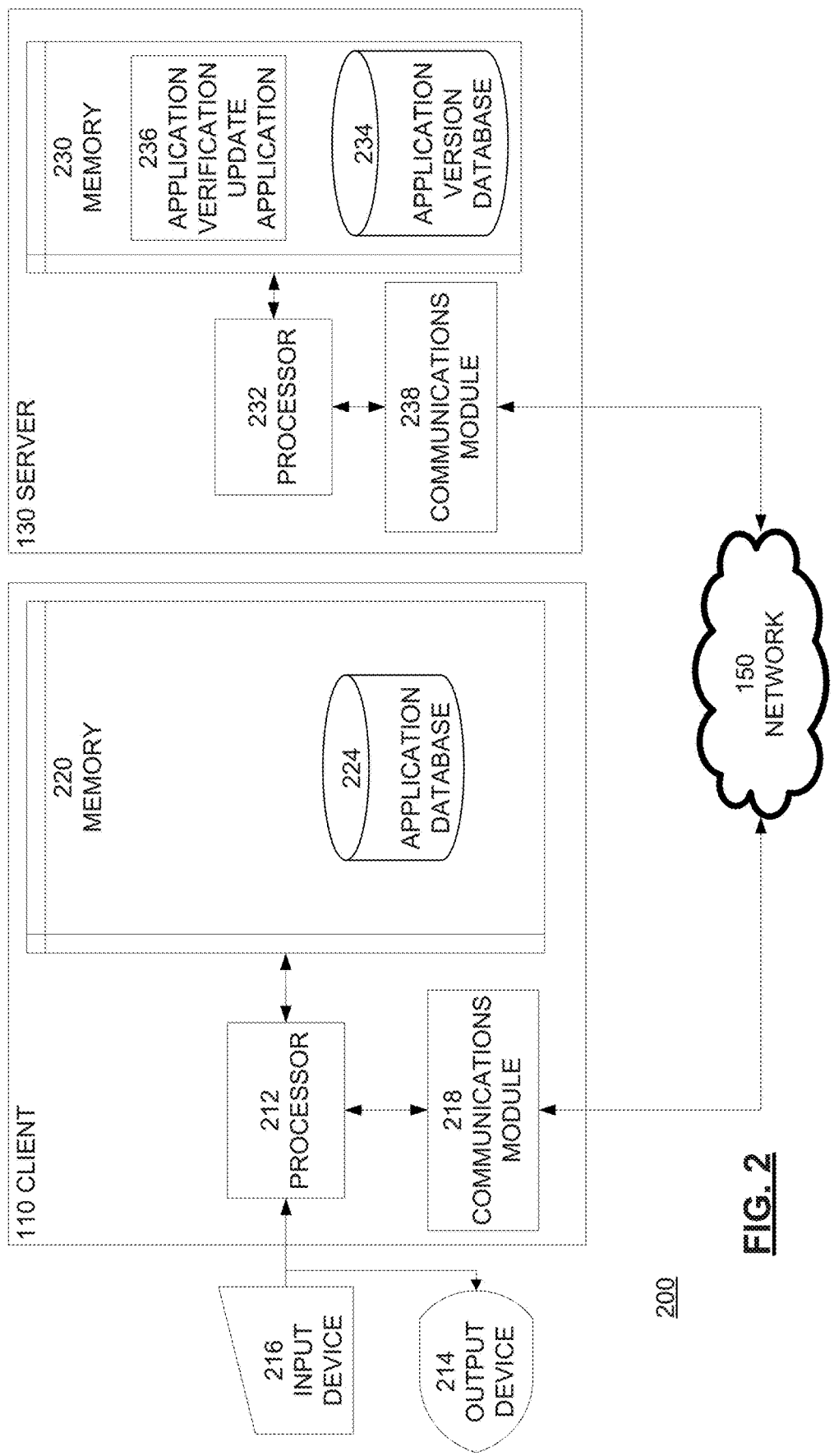
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure.

The client 110 and the server 130 are connected over the network 150 via respective communications modules 218 and 238. The communications modules 218 and 238 are configured to interface with the network 150 to send and receive information, such as data, requests, responses, tools and commands to other devices on the network. The communications modules 218 and 238 can be, for example, modems or Ethernet cards. The client 110 also includes an input device 216, such as a stylus, touchscreen, keyboard, or mouse, and an output device 214, such as a display. The server 130 includes a processor 232, the communications module 238, and a memory 230. The memory 230 includes an application version database 234 and an application verification/update application 236.

The client 110 further includes a processor 212, the communications module 218, and a memory 220. The memory 220 includes an application database 224. The application database 224 may include, for example, various software applications and related application information, each which may be interacted with by a user of the client 110. The client 110 may be configured to initiate one or more user inputs related to an application from the application database 224, querying the application version database 234 on the server 130 for application version content relevant to the user inputs, and receiving and storing application updates transmitted from the application verification/update application 236 on the server 130.

The processors 212, 232 of the client 110, server 130 are configured to execute instructions, such as instructions physically coded into the processor 212, 232 instructions received from software in memory 220, 230 or a combination of both. For example, the processor 212 of the client 110 may execute instructions to provide application version information to the server 130, to receive application updates from the server 130, to store the received application updates in the application database 224, and to provide the application information for display on the client 110. The processor 232 of the server 130 may execute instructions to obtain application version information from any participant of the system, to analyze/process the application version information and store the results in the application version database 234, to generate application updates from the application version database 234, and to deploy the application updates to the client 110. The client 110 is configured to request and receive relevant content to/from the server 130 over the network 150 using the respective communications modules 218 and 238 of the client 110 and server 130.

Specifically, the processor 212 of the client 110 executes instructions causing the processor 212 to receive user input (e.g., using the input device 216) to accept or approve application updates received from the server 130 through the network 150 and to store application version information within the application database 224. For example, the user may view and approve, on the client 110, a request for approval to install an application update received from the server 130 via the network 150, which then installs the deployed application update on the client 110.

The processor 232 of the server 130 may receive a set of user inputs to use in monitoring for new application versions or as the basis for deploying application updates out to clients 110. The processor 232 of the server 130 may execute the application verification/update application 236 over the inputs provided by the user. The processor 232 of the server 130 may then execute the application verification/update application 236 to determine and deploy appropriate application updates to the client 110.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
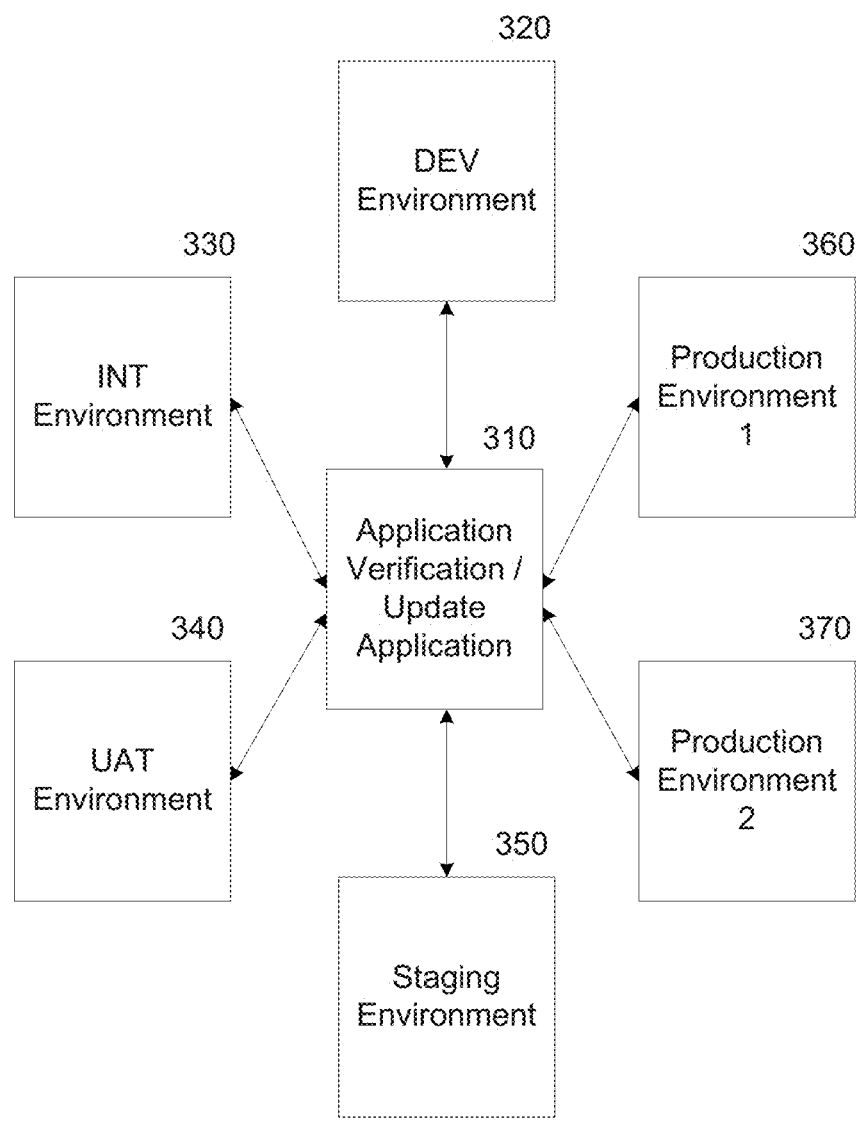
FIG. 3 illustrates an example implementation of a platform discovery and deployment automation system.

FIG. 3 illustrates an example platform discovery and deployment automation system 300. An application monitoring and updating system 310 may be implemented as a virtual private cloud. Any number of additional virtual private cloud environments may interface with the application monitoring and updating system 310. As illustrated in FIG. 3, there may be a development environment 320, an integration environment 330, a user acceptance testing (UAT) environment 340, a staging environment 350, a first customer production environment 360 and a second customer production environment 370. The platform discovery and deployment automation system 300 may be implemented as a hub and spoke arrangement, with the application monitoring and updating system 310 as a central hub and each of the environments 320-370 as spokes communicating to and from the central hub. The application monitoring and updating system 310 may monitor version levels of all applications running in each of the environments 320-370. The application monitoring and updating system 310 may deploy new or updated version levels of all applications running in each of the environments 320-370

For example, the platform discovery and deployment automation system 300 may be operated by a service provider, where the service provider offers a variety of applications to its customers (e.g., 25 different applications). The service provider in this example has several environments, one in which new versions of the 25 applications (e.g., bug fixes, enhancements, support for additional features, security updates, etc.) are developed in the development environment 320. Each developed application version may then be initially tested (e.g., alpha testing) in the integration environment 330. The alpha tested application version is then further tested (e.g., beta tested) in the UAT environment 340. The beta tested application version Here, each customer may opt to utilize any number of the 25 applications. Continuing the above example of FIG. 3, the first customer production environment 360 may use 18 of the 25 available applications, while the second customer production environment 370 may use all 25 available applications. Here, the application monitoring and updating system 310 may monitor the version levels of the 18 applications used by the first customer production environment 360, and deploy updated versions of any of the 18 applications to the first customer production environment 360. Similarly, the application monitoring and updating system 310 may monitor version levels and deploy updated versions for the 25 application used by the second customer production environment 370. The platform discovery and deployment automation system 300 may have any number of system environments (e.g., additional development or testing environments) and any number of customer production environments. For example, platform discovery and deployment automation system 300 may have any number of customers that each utilize a set of applications/services provided by a hosting company.

As illustrated in FIG. 4, the application monitoring and updating system 310 may include a user interface 400 provided as a single pane of glass. The user interface 400 may include a current application version listing 410 for each environment, and provide an update version link or button 420 that provides for updating a particular application version in a listed environment with the click of the button 420. For example, in FIG. 4 the performance-management application in the INT environment is currently listed at version 1.0.7, which is the same version that is listed in the DEV environment, so no update is available to the INT environment version of the performance-management application. As another example, the marketplace application in the INT environment is currently at 0.0.11 and the DEV environment version of the marketplace application is a new version 0.0.12. Thus, if the update version button 420 is selected in the marketplace application section of the INT environment, the application monitoring and updating system 310 then deploys and/or installs the new marketplace version 0.0.12 from the DEV environment to the INT environment, as well as updates the current version listing in the user interface 400. The user interface 400 may also include similar application version listings for each customer production environment.

FIG. 5 shows an example application deployment screen 500 provided by the disclosed system. The application deployment screen 500 may include options to enter the version number of the particular application (e.g., performance-management application) to be deployed on a particular environment (e.g., bravo), the environment that the docker container that contains the version of the application to be deployed was built in (e.g., dev environment), whether additional information (e.g., New Relic Agent) should be added, which environments (e.g., only bravo environment) to which the selected application version is to be deployed, and an update link or button.

As shown in FIG. 6, the disclosed system may also provide an application monitoring screen 600 for any given environment. The application monitoring screen 600 may provide information such as the applications associated with the environment, profile information (e.g., docker, docker swarm), the application state (e.g., not running, deploy abandoned, ready to replace), time of last deployment, and an action listing (e.g., none, deploy, force replace).

Figure 7:
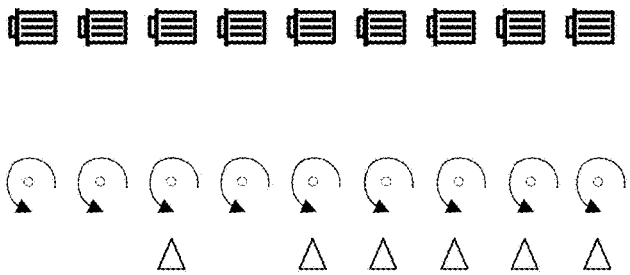
FIG. 7 illustrates an example application update screen.

FIG. 7 illustrates an example application update screen 700. The application update screen 700 may provide for selecting and/or starting the actual application update process (e.g., force replace).

FIGS. 8-17 illustrate example processes 800-1700 of a platform discovery and deployment automation system using the example server 130 of FIG. 2. While FIGS. 8-17 are described with reference to FIG. 2, it should be noted that the process steps of FIGS. 8-17 may be performed by other systems.

Figure 8:
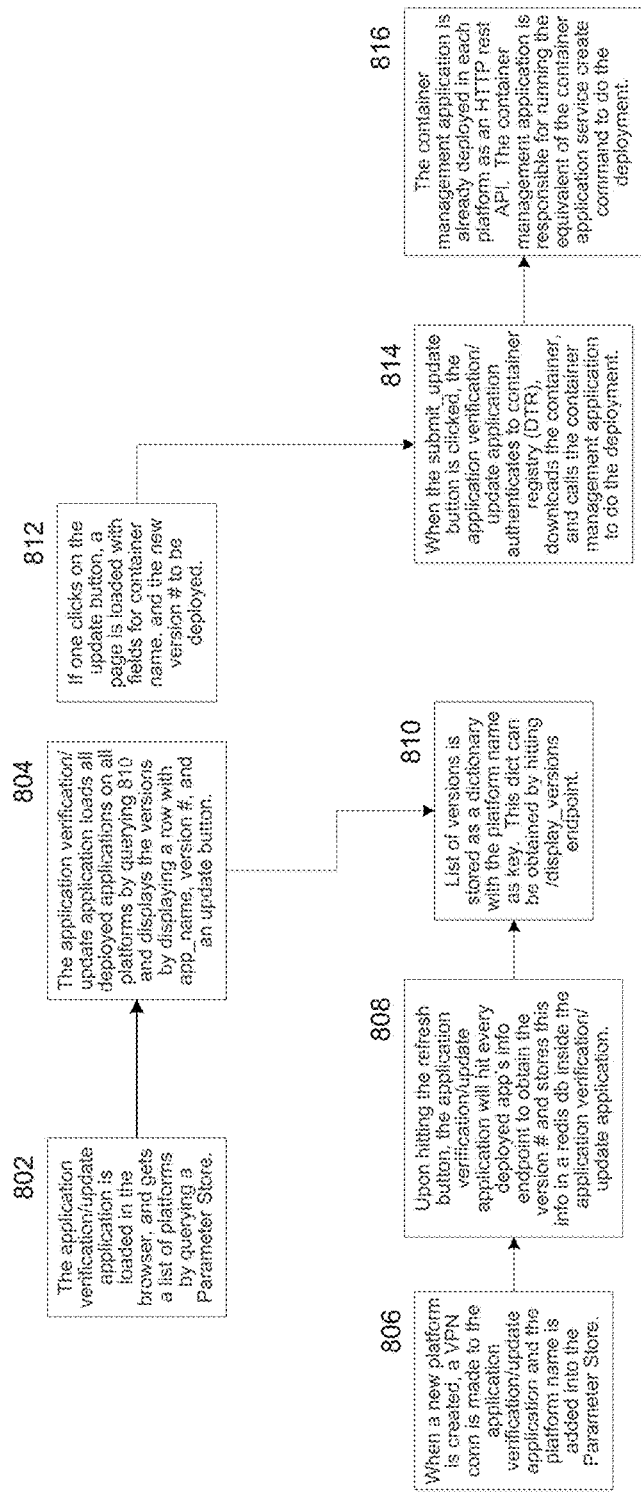
FIG. 8 illustrates an example process associated with the disclosure of FIG. 2.

Regarding the platform discovery and deployment automation system described above, in various embodiments the system provides for application version monitoring and updating as illustrated in the example platform discovery and deployment update processes of FIGS. 8-13. FIG. 8 shows an overview process 800. One aspect of the process includes loading a platform discovery and deployment automation application into a browser and getting a list of platforms by querying a database services parameter store in step 802. For example, the platform discovery and deployment automation application may be a web based application written in Python Flask and using Celery for asynchronous task processing with Redis DB as a data store. In step 804, the platform discovery and deployment automation application loads all deployed applications on all platforms by querying a stored list of versions and then displaying the versions (e.g., display by application name, version number and provide an update button). The process of creating the stored list of application versions begins in step 806, where when a new platform is created, a virtual private network connection is made to the platform discovery and deployment automation application and the new platform name is added into the database services parameter store. In step 808, upon activation of a refresh button, the platform discovery and deployment automation application hits every deployed application's information endpoint to obtain the application version number and then store the obtained application version number in a database within the platform discovery and deployment automation application. A list of application versions is thus created and stored as a dictionary with the platform name as a key in step 810. The dictionary may be obtained by hitting a display versions endpoint. In step 812, when an application update button is activated (e.g., clicked on), a page is loaded with fields for a container name and the new version number to be deployed. In step 814, when a submit update button is activated, the platform discovery and deployment automation application authenticates to a container registry, downloads the container and calls a container management application to do the deployment. In step 816, the container management application is deployed in each platform as a hypertext transfer protocol (HTTP) rest application programming interface (API). The container management application is responsible for running the equivalent of a docker service create command to do the deployment.

Figure 9:
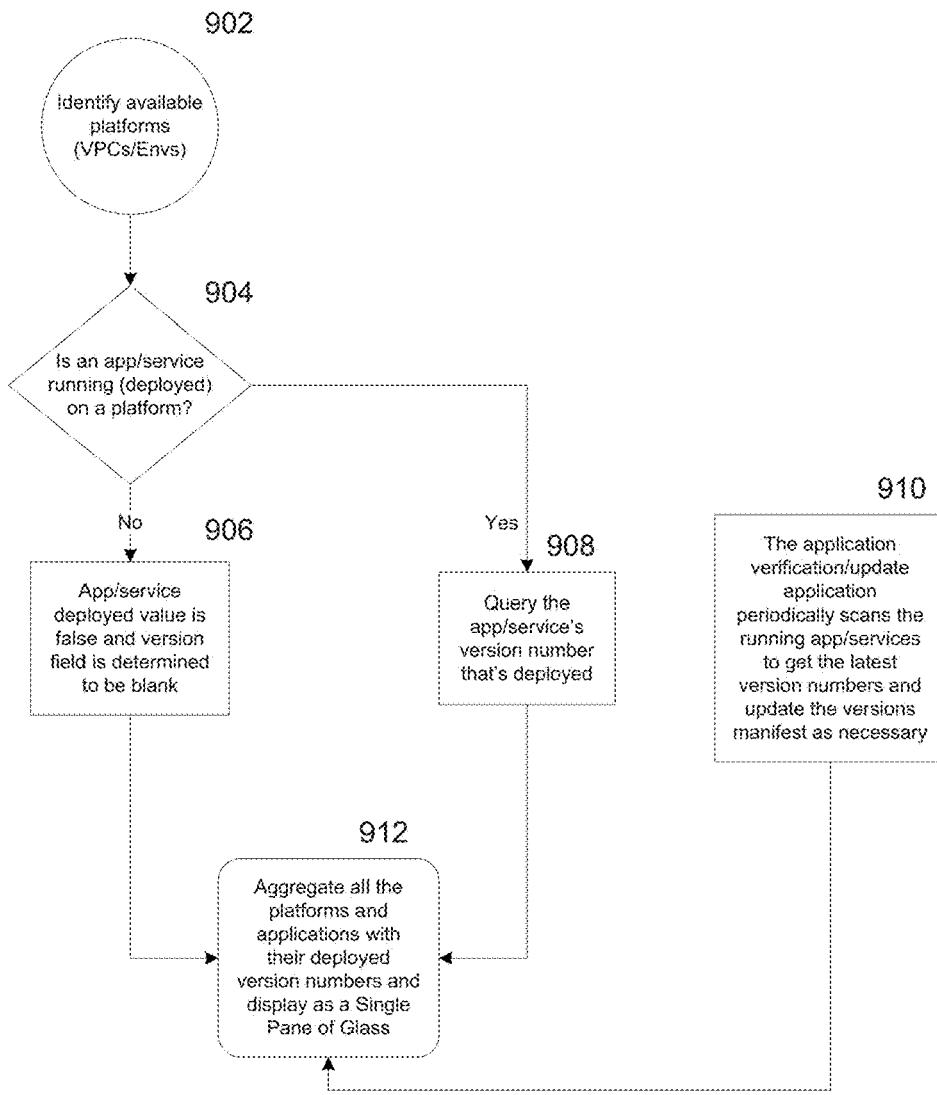
FIG. 9 illustrates an example process associated with the disclosure of FIG. 2.

FIG. 9 shows a platform discovery process 900. In step 902, available platforms (e.g., virtual private clouds, environments) are identified. A determination whether an application and/or service is running (e.g., deployed) on an identified platform is made in step 904. In step 906, if the answer is no, an application/service deployed value is set to false and a version field is determined to be blank. If the answer is yes, that application/service version number that is deployed is queried in step 908. In step 910, the platform discovery and deployment automation application periodically scans the running applications/services to get the latest version numbers and updates a versions manifest as necessary. In step 912, all of the platforms and applications with deployed version numbers are aggregated and displayed in an interface (e.g., a single pane of glass).

Figure 10:
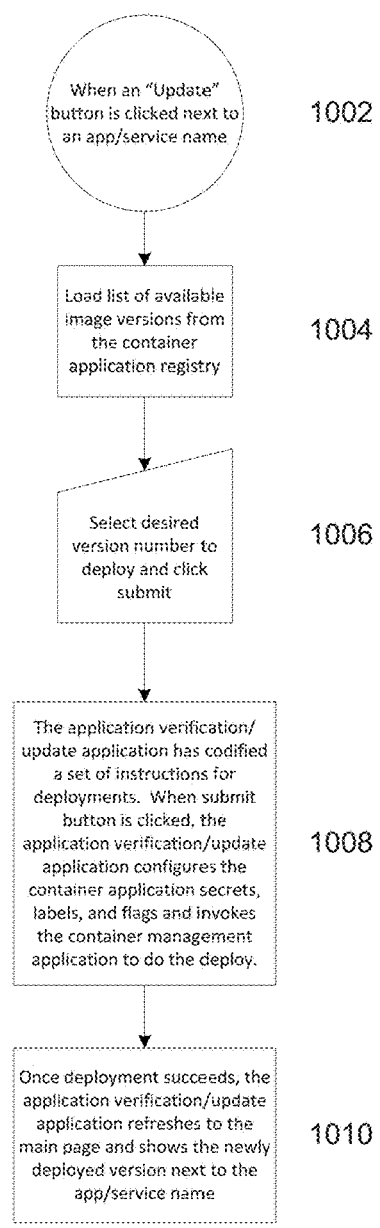
FIG. 10 illustrates an example process associated with the disclosure of FIG. 2.

An application update deployment process 1000 is shown in FIG. 10. The process begins in step 1002 when an update button next to an application/service name is activated. In step 1004, a list of available image versions is loaded from a docker registry. A desired version number to deploy is selected by activating a submit button in step 1006. In step 1008, the platform discovery and deployment automation application configures docker secrets, labels and flags, and invokes the container management application to do the deployment when the submit button is activated or clicked. The platform discovery and deployment automation application may have codified a set of instructions for deployments. In step 1010, once the deployment succeeds, the platform discovery and deployment automation application refreshes to the main page and displays the newly deployed version next to the application/service name.

Figure 11:
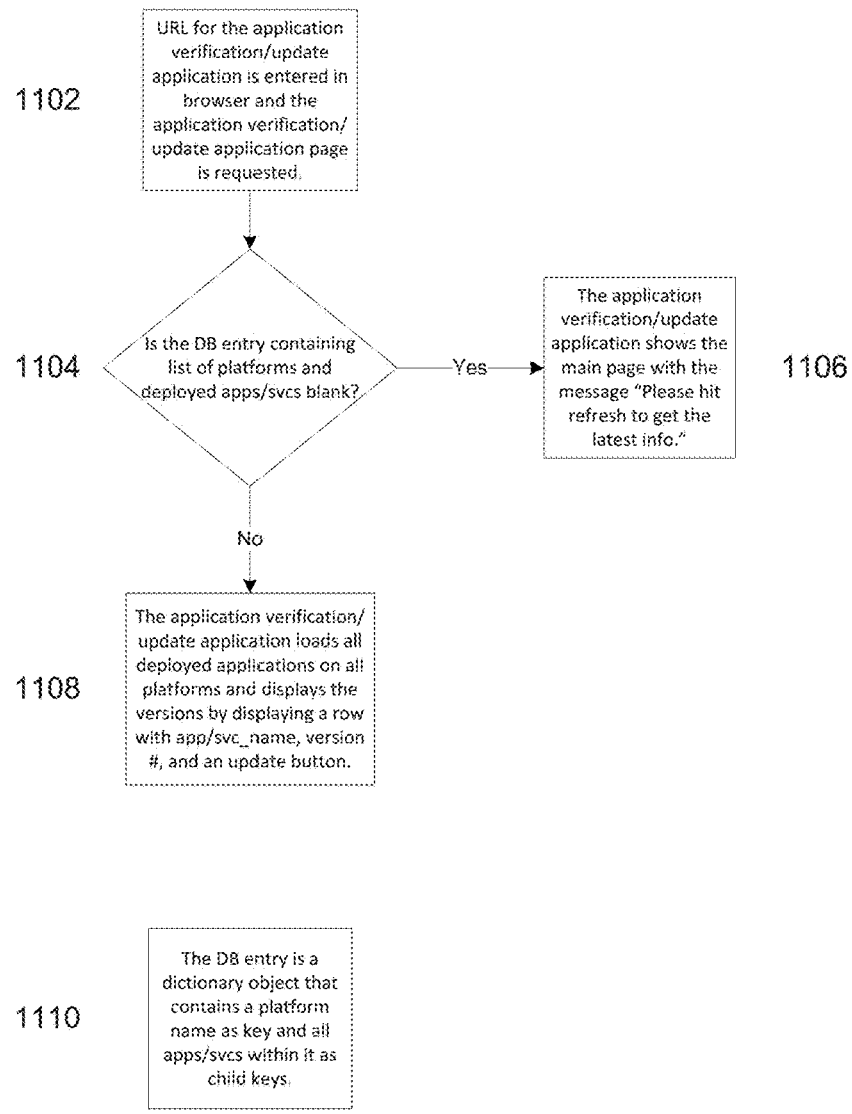
FIG. 11 illustrates an example process associated with the disclosure of FIG. 2.

In FIG. 11, a single pane of glass process 1100 is shown. The process begins in step 1102 when a URL for the platform discovery and deployment automation application is entered in a browser and a platform discovery and deployment automation application page is requested. In step 1104, it is determined if the databased entry containing a list of platforms and deployed applications/services is blank. If the determination in step 1104 is yes, the platform discovery and deployment automation application displays the main page with the a message to hit refresh to get the latest information in step 1106. If the determination in step 1104 is no, the platform discovery and deployment automation application loads all deployed applications on all platforms and displays the versions, such as by displaying in rows with the application/service name, the version number and an update button in step 1108. In step 1110, the database entry may be a dictionary object that contains a platform name as a key and all applications/services within it as child keys.

Figure 12:
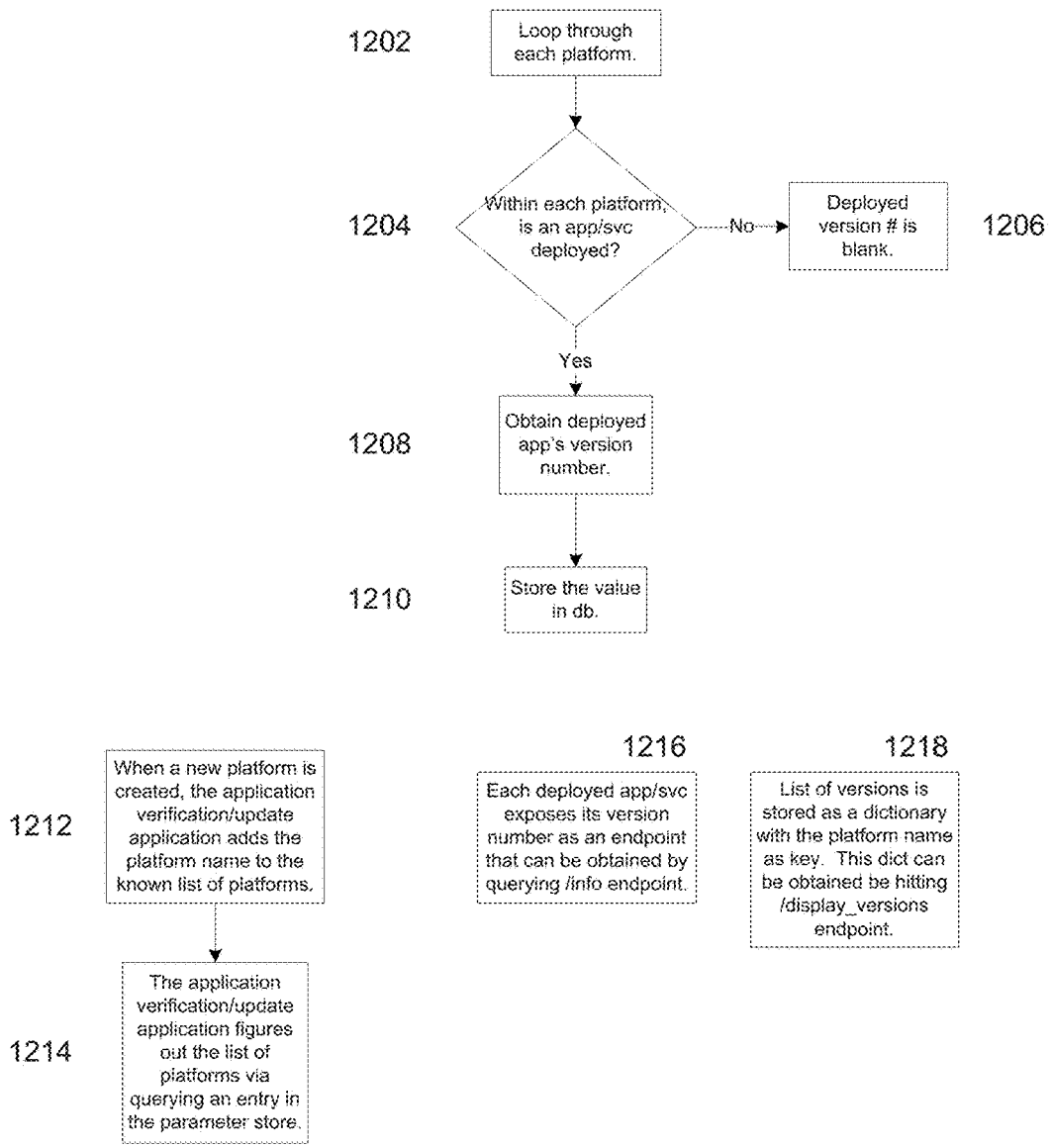
FIG. 12 illustrates an example process associated with the disclosure of FIG. 2.

With regard to FIG. 12, a platform discover process 1200 is shown, which begins in step 1202 by doing a loop through each platform. In step 1204, a determination is made whether within each platform an application/service is deployed. If the determination is no, the deployed version number is displayed as a blank in step 1206. If the determination is yes, the deployed application/service version number is obtained in step 1208. In step 1210, the obtained application/service version number is stored in a database. When a new platform is created, the platform discovery and deployment automation application adds the platform name to the list of known platforms in step 1212. In step 1214, the platform discovery and deployment automation application determines the list of platforms via querying an entry in a database service application parameter store. In step 1216, each deployed application/service exposes its version number as an endpoint that can be obtained by querying the information endpoint. In step 1218, a list of versions is stored as a dictionary with the platform name as a key. The dictionary may be obtained by hitting the display versions endpoint.

Figure 13:
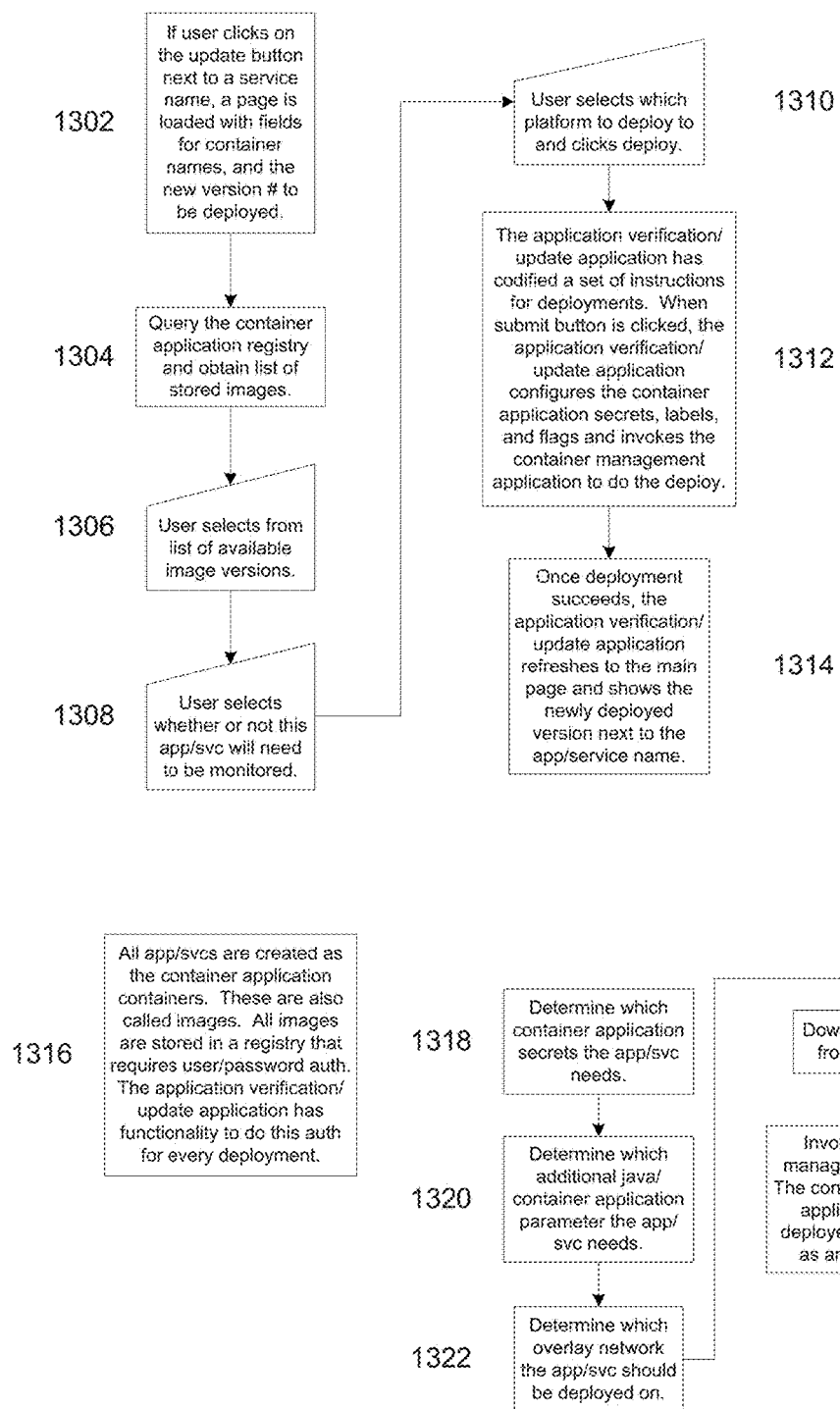
FIG. 13 illustrates an example process associated with the disclosure of FIG. 2.

FIG. 13 shows a deployment process 1300. In step 1302, when an update button next to an application/service name is activated, a page is loaded with fields for a container name and the new application/service version number to be deployed. A docker registry is queried and a list of stored images is obtained in step 1304. In step 1306, a selection is made from a list of available image versions. A selection is made as to whether or not the application/service will need to be monitored in step 1308. In step 1310, a selection is made which platform to deploy the selected version to and a deployment button is activated (e.g., clicked). In step 1312, the platform discovery and deployment automation application has codified a set of instructions for deployments so that when a submit button is activated, the platform discovery and deployment automation application configures the docker secrets, labels and flags, as well as invokes the container management application to do the deployment. Once deployment succeeds, the platform discovery and deployment automation application refreshes to the main page and shows the newly deployed version next to the application/service name in step 1314.

In step 1316, all applications/services are created as docker containers, which are also called images. All images are stored in a registry that may require user and password authorization. The platform discovery and deployment automation application may do such an authorization for every deployment. In step 1318, it is determined which docker secrets the application/service needs. A determination which additional java/docker parameter the application/service needs is made in step 1320. In step 1322, it is determined which overlay network the application/service should be deployed on. The image is then downloaded from the registry in step 1324. In step 1326, the container management application is invoked, where the container management application is already deployed in each platform as an HTTP rest API.

Figure 14:
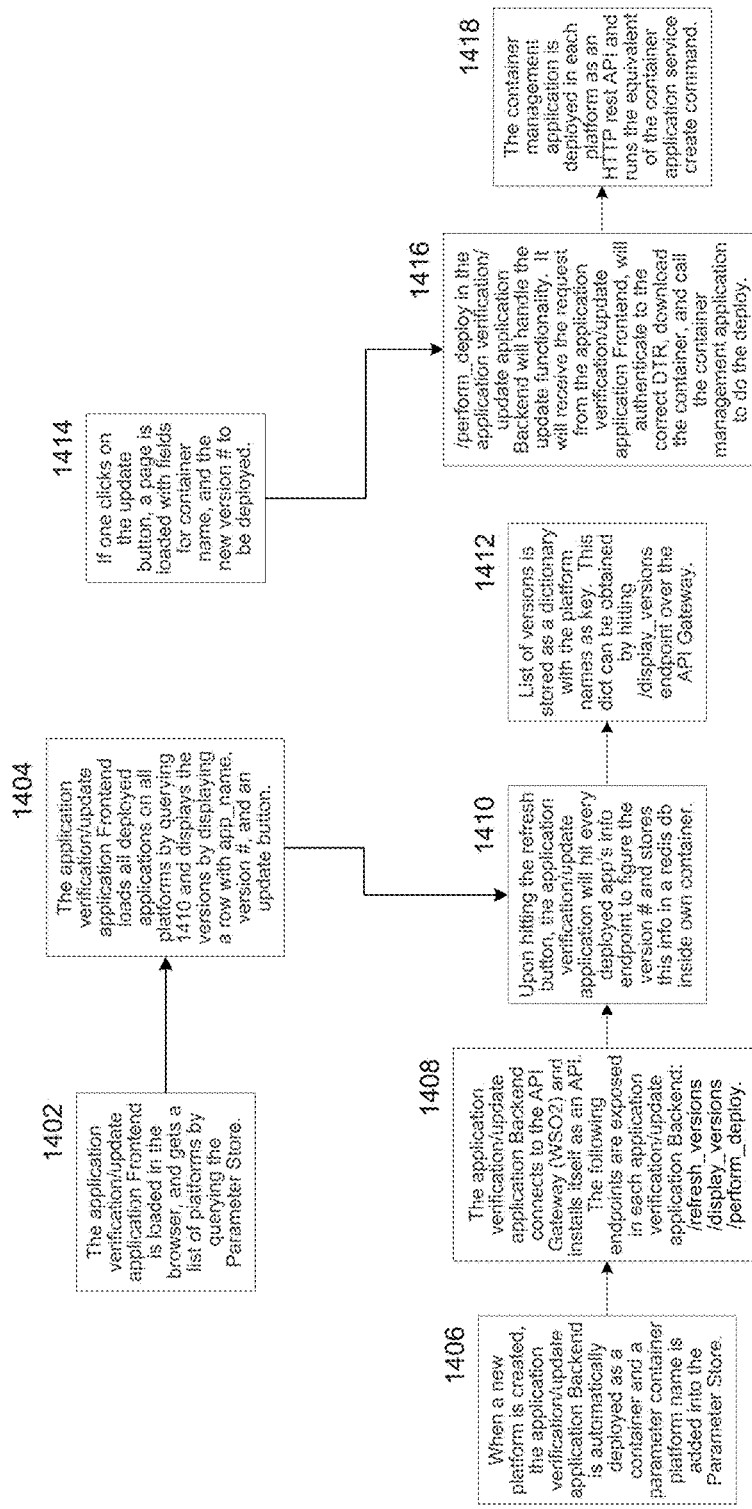
FIG. 14 illustrates an example process associated with the disclosure of FIG. 2.

Regarding the platform discovery and deployment automation system described above, in various embodiments the system provides for application version monitoring and updating as illustrated in the example platform discovery and deployment update processes of FIGS. 14-17. FIG. 14 shows an overview process 1400. One aspect of the process includes loading a platform discovery and deployment automation frontend into a browser and getting a list of platforms by querying a database services parameter store in step 1402. For example, the platform discovery and deployment automation frontend may be a web application or a single page javascript application. In step 1404, the platform discovery and deployment automation frontend loads all deployed applications on all platforms by querying deployed application/service information endpoints and then displaying the versions (e.g., display by application name, version number and provide an update button).

The process of creating a stored list of application/service versions begins in step 1406, where when a new platform is created, a platform discovery and deployment automation backend is automatically deployed as a container and a parameter container platform name is added into the database services application parameter store. The platform discovery and deployment automation backend may include a web application, a Celery worker and a Redis db, for example. In step 1408, the platform discovery and deployment automation backend connects to an API gateway and installs itself as an API. Each platform discovery and deployment automation backend may expose various endpoints, such as refresh versions, display versions and perform deploy, for example. In step 1410, upon activation of a refresh button, the platform discovery and deployment automation application hits every deployed application's information endpoint to determine the application version number and then store the determined application version number in a database (e.g., redis db) having its own container. A list of application versions is thus created and stored as a dictionary with the platform name as a key in step 1412. The dictionary may be obtained by hitting a display versions endpoint over the API gateway.

In step 1414, when an update button is activated (e.g., clicked on), a pop-up is opened with fields for a container name and the new version number to be deployed. In step 1416, the platform discovery and deployment automation backend handles the update process where it receives a request from the platform discovery and deployment automation frontend, authenticates to the docker trusted registry (DTR), downloads the container and calls a container management application to do the deployment. In step 1418, the container management application is deployed in each platform as an HTTP rest application API. The container management application runs the equivalent of a docker service create command to do the deployment. Process 1400 includes an API gateway in place in each virtual private cloud, thus eliminating the need for virtual private cloud peering connections.

Figure 15:
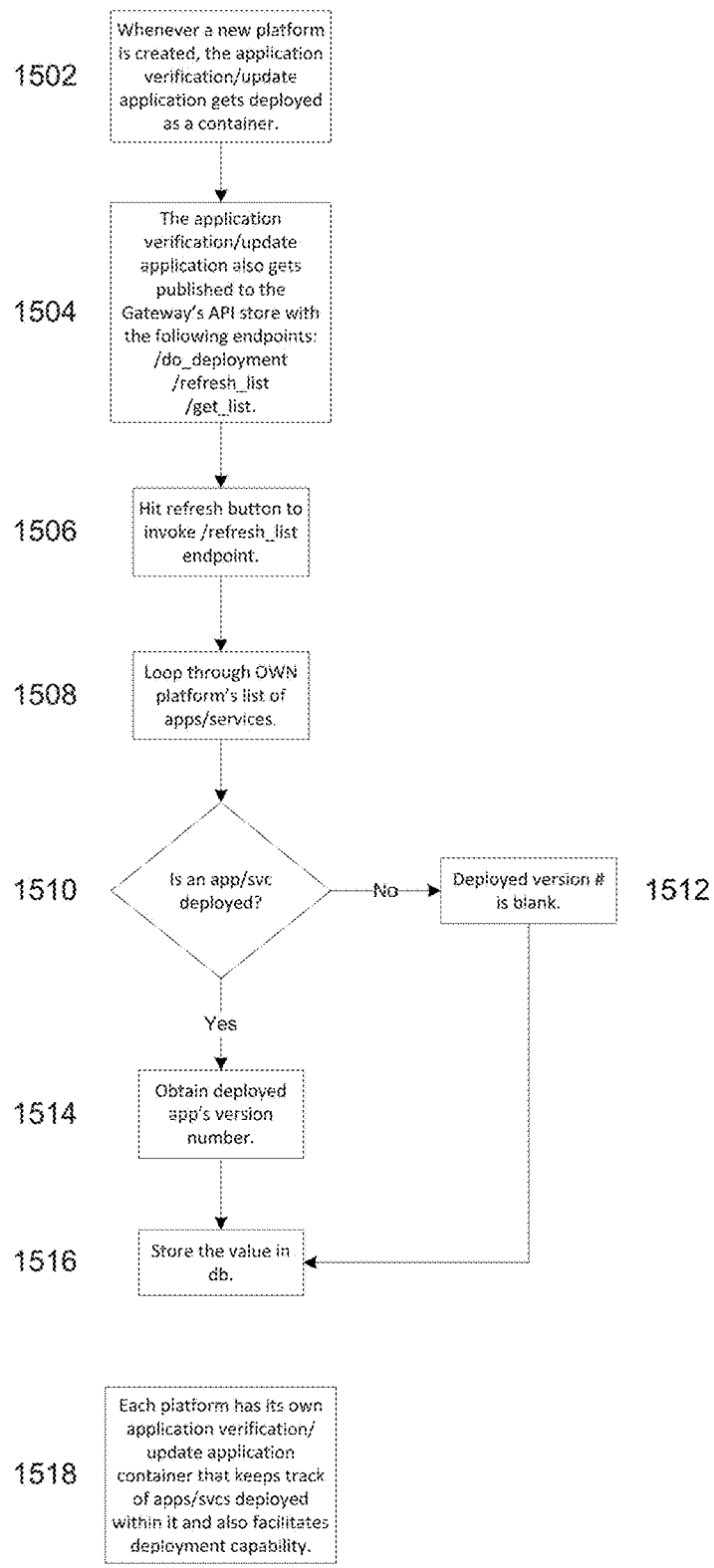
FIG. 15 illustrates an example process associated with the disclosure of FIG. 2.

FIG. 15 shows a platform discovery process 1500. In step 1502, whenever a new platform is created, the platform discovery and deployment automation application is deployed as a container. The platform discovery and deployment automation application gets published to the gateway's API store with various endpoints, such as do deployment, refresh list and get list in step 1504. In step 1506, a refresh button is activated, thus invoking the refresh list endpoint. In step 1508, a loop is made through the platform's own list of applications/services. A determination whether an application/service is deployed is made in step 1510. In step 1512, if the answer is no, a deployed version number is set to blank. If the answer is yes, the deployed application/service version number obtained in step 1514. In step 1516, the blank or the obtained version number is stored in the database. In step 1518, each platform has its own platform discovery and deployment automation application container that keeps track of applications/services deployed within the platform and that also facilitates deployment capability.

Figure 16:
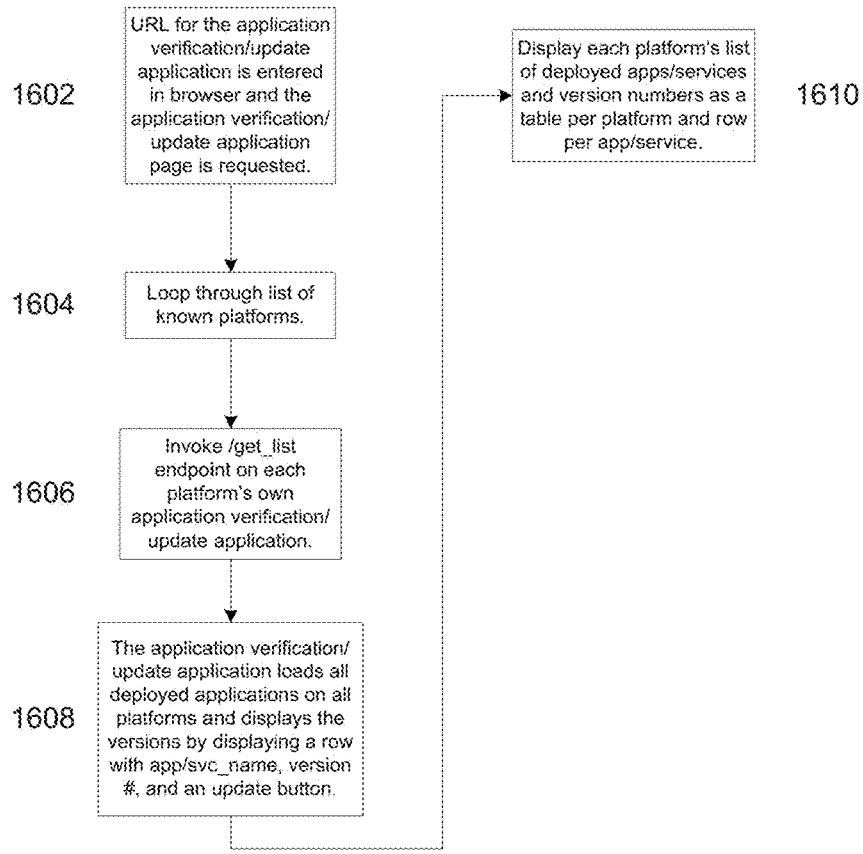
FIG. 16 illustrates an example process associated with the disclosure of FIG. 2.

In FIG. 16, a single pane of glass process 1600 is shown. The process begins in step 1602 when a URL for the platform discovery and deployment automation application is entered in a browser and a platform discovery and deployment automation application page is requested. In step 1604, a loop through a list of known platforms is performed. A get list endpoint is invoked on each platform's own platform discovery and deployment automation application in step 1606. In step 1608, the platform discovery and deployment automation application loads all deployed applications on all platforms and displays the versions, such as by displaying in rows having the application/service name, the version number and an update button. In step 1610, each platform's list of deployed applications/services and version numbers is displayed as a table per platform and as a row per application/service.

Figure 17:
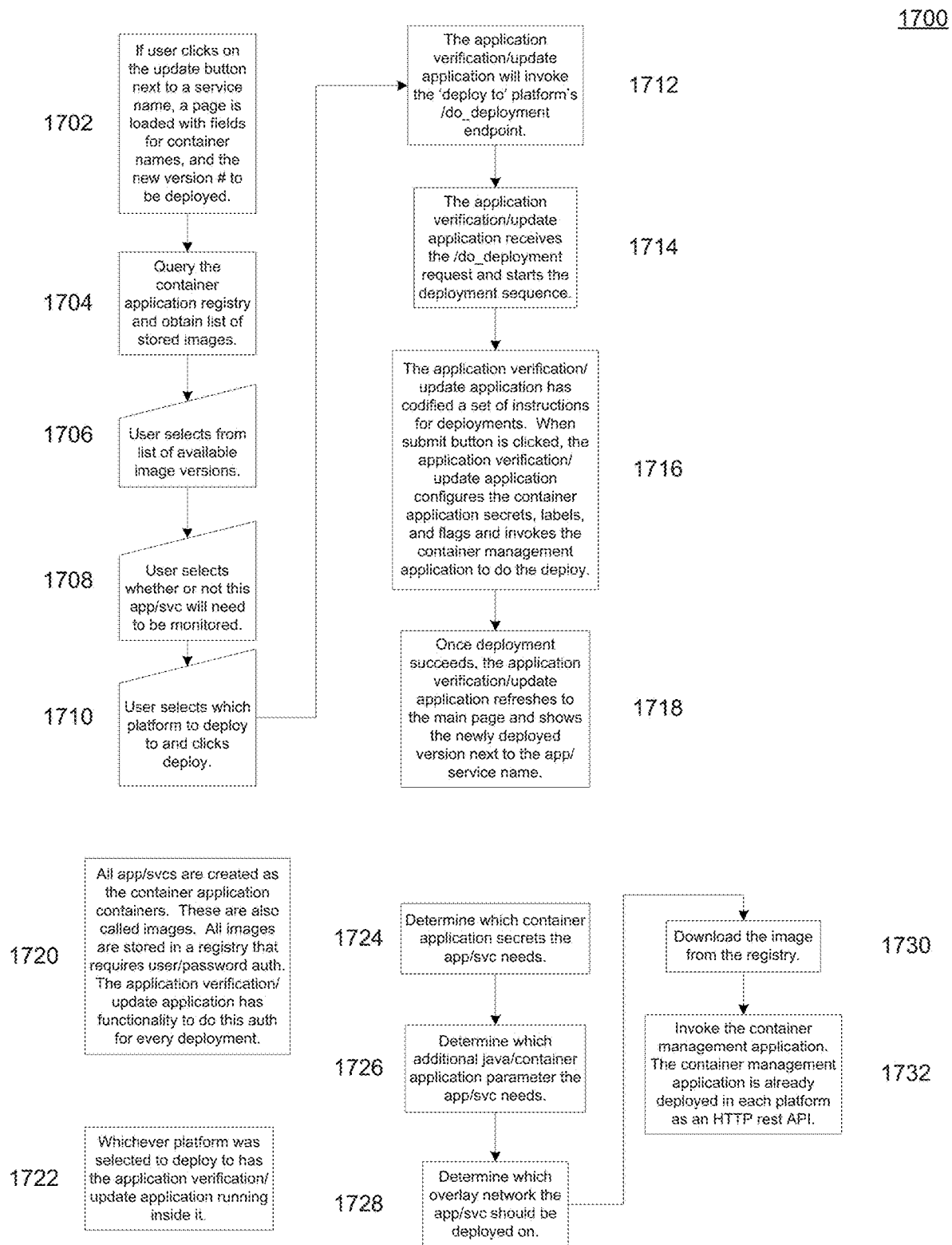
FIG. 17 illustrates an example process associated with the disclosure of FIG. 2.

FIG. 17 shows a deployment process 1700. In step 1702, when an update button next to an application/service name is activated, a page is loaded with fields for a container name and the new application/service version number to be deployed. A docker registry is queried and a list of stored images is obtained in step 1704. In step 1706, a selection is made from a list of available image versions. A selection is made as to whether or not the application/service will need to be monitored in step 1708. In step 1710, a selection is made which platform to deploy the selected version to. In step 1712, the platform discovery and deployment automation application invokes the deploy to platform's do deployment endpoint. The platform discovery and deployment automation application receives the do deployment request and starts the deployment sequence in step 1714. In step 1716, the platform discovery and deployment automation application has codified a set of instructions for deployments so that when a submit button is activated, the platform discovery and deployment automation application configures the docker secrets, labels and flags, as well as invokes the container management application to do the deployment. Once deployment succeeds, the platform discovery and deployment automation application refreshes to the main page and shows the newly deployed version next to the application/service name in step 1718.

In step 1720, all applications/services are created as docker containers, which are also called images. All images are stored in a registry that may require user and password authorization. The platform discovery and deployment automation application may do such an authorization for every deployment. The selected deploy to platform has a platform discovery and deployment automation application running within the platform in step 1722. In step 1724, it is determined which docker secrets the application/service needs. A determination which additional java/docker parameter the application/service needs is made in step 1726. In step 1728, it is determined which overlay network the application/service should be deployed on. The image is then downloaded from the registry in step 1730. In step 1732, the container management application is invoked, where the container management application is already deployed in each platform as an HTTP rest API.

An example will now be described using the example processes 800-1700 of FIGS. 8-17, a client 110 that has a laptop computer having an output device 214 that is a flat panel display, an input device 216 that is a touch screen interface, an application database 224 that stores application version information that can be displayed on the laptop computer, and a communications module 218 that provides for communication between the laptop computer client 110 and a network 150 of servers 130, with at least one server 130 having an application version database 234 and an application verification/update application 236. The application verification/update application 236 may utilize a virtual machine, which may be operating on a blockchain, for example. The application verification/update application 236 may utilize parallel processors in server 130, processors of multiple servers 130 and/or clients 110 over network 150, or a combination of both.

In one example, the process begins when the application verification/update application 236 on a server 130 identifies available application/service platforms associated with a platform discovery and deployment system. The available application/service platform information may be stored in the application database 224, the application version database 234 or on a blockchain. The application verification/update application 236 then determines all applications/services that are running on the identified application/service platforms.

Continuing the example, the application verification/update application 236 determines and/or sets a version field to be blank for a particular application/service that is not found to be running on a specific platform. For each application/service that is found to be running on a platform, the application verification/update application 236 queries the currently running version number of that application/service, obtains an associated version number value and stores the obtained version number value in the application version database 234. The application verification/update application 236 further provides a user interface to be displayed on the flat panel display 214 of the client 110, which is displayed as a single pane of glass, for example. The single pane of glass interface lists all of the identified applications/services running on each identified platform. For example, the single pane of glass may list each identified platform (e.g., environment) in vertical columns, each column listing all of the applications/services associated with the platform discovery and deployment system. Each listing may include the application/service name, the current version of the application/service that is running on the platform, and an update version link or button that may be activated to deploy an updated version of the application/service to that platform.

If an updated or new version of an application/service is to be deployed, the update version button next to the desired application/service listing on the single pane of glass interface is activated (e.g., clicked on the touch screen interface 216) and the application verification/update application 236 receives an activation update signal from the client 110 over the network 150. The application verification/update application 236 then queries a docker registry to obtain a list of stored image versions of the selected application/service, which is then provided for display on the flat panel display 214 of the client 110. The application verification/update application 236 receives a selection of one of the stored image versions and a selection of the platform to which the selected image version is to be deployed. The application verification/update application 236 then deploys the selected image version to the platform and updates the single pane of glass interface to show the updated version number for that application/service on that platform.

Thus, the application verification/update application 236 allows a user to monitor and update applications and services running on multiple platforms or environments, all from a single user interface.

Hardware Overview

Figure 18:
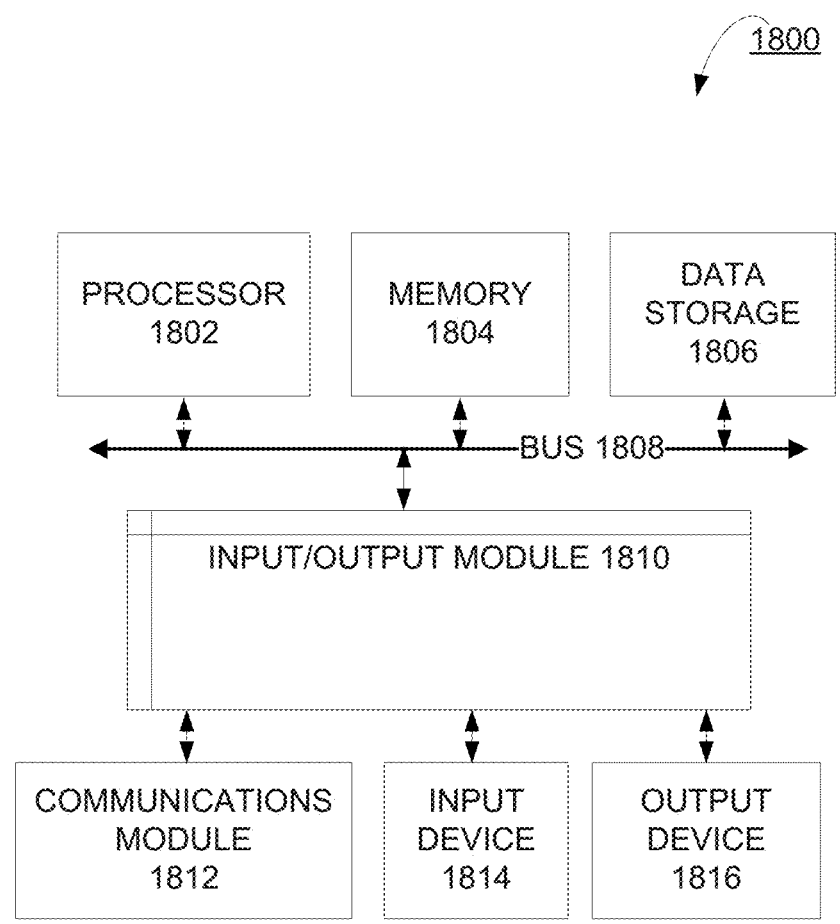
FIG. 18 is a block diagram illustrating an example computer system with which the clients and server of FIG. 2 can be implemented.

FIG. 18 is a block diagram illustrating an example computer system 1800 with which the client 110 and server 130 of FIG. 2 can be implemented. In certain aspects, the computer system 1800 may be implemented using hardware or a combination of software and hardware, either in a dedicated server or integrated into another entity or distributed across multiple entities.

Computer system 1800 (e.g., client 110 or server 130) includes a bus 1808 or other communication mechanism for communicating information, and a processor 1802 (e.g., processor 212 and 232) coupled with bus 1808 for processing information. According to one aspect, the computer system 1800 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 1800 may be implemented with one or more processors 1802. Processor 1802 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 1800 can include, in addition to hardware, code that creates an execution environment for the computer program in question, e.g., code that constitutes processor firmware, a protocol stack, a database management system, an operating system, or a combination of one or more of them stored in an included memory 1804 (e.g., memory 220 and 230), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1808 for storing information and instructions to be executed by processor 1802. The processor 1802 and the memory 1804 can be supplemented by, or incorporated in, special purpose logic circuitry. Expansion memory may also be provided and connected to computer system 1800 through input/output module 1810, which may include, for example, a SIMM (Single in Line Memory Module) card interface. Such expansion memory may provide extra storage space for computer system 1800 or may also store applications or other information for computer system 1800. Specifically, expansion memory may include instructions to carry out or supplement the processes described above and may include secure information also. Thus, for example, expansion memory may be provided as a security module for computer system 1800 and may be programmed with instructions that permit secure use of computer system 1800. In addition, secure applications may be provided via the SIMM cards, along with additional information, such as placing identifying information on the SIMM card in a non-hackable manner.

The instructions may be stored in the memory 1804 and implemented in one or more computer program products, i.e., one or more modules of computer program instructions encoded on a computer readable medium for execution by, or to control the operation of, the computer system 1800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 1804 may also be used for storing temporary variable or other intermediate information during execution of instructions to be executed by processor 1802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1800 further includes a data storage device 1806 such as a magnetic disk or optical disk, coupled to bus 1808 for storing information and instructions. Computer system 1800 may be coupled via input/output module 1810 to various devices. The input/output module 1810 can be any input/output module. Example input/output modules 1810 include data ports such as USB ports. In addition, input/output module 1810 may be provided in communication with processor 1802, so as to enable near area communication of computer system 1800 with other devices. The input/output module 1810 may provide, for example, for wired communication in some implementations, or for wireless communication in other implementations, and multiple interfaces may also be used. The input/output module 1810 is configured to connect to a communications module 1812. Example communications modules 1812 (e.g., communications modules 218 and 238) include networking interface cards, such as Ethernet cards and modems.

The components of the system can be interconnected by any form or medium of digital data communication, e.g., a communication network. The communication network (e.g., network 150) can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like.

For example, in certain aspects, communications module 1812 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 1812 sends and receives electrical, electromagnetic or optical signals that carry digital data streams representing various types of information. The network link typically provides data communication through one or more networks to other data devices. For example, the network link of the communications module 1812 may provide a connection through local network to a host computer or to data equipment operated by an Internet Service Provider (ISP). The ISP in turn provides data communication services through the world wide packet data communication network now commonly referred to as the Internet. The local network and Internet both use electrical, electromagnetic or optical signals that carry digital data streams. The signals through the various networks and the signals on the network link and through communications module 1812, which carry the digital data to and from computer system 1800, are example forms of transmission media.

Computer system 1800 can send messages and receive data, including program code, through the network(s), the network link and communications module 1812. In the Internet example, a server might transmit a requested code for an application program through Internet, the ISP, the local network and communications module 1812. The received code may be executed by processor 1802 as it is received, and/or stored in data storage 1806 for later execution.

In certain aspects, the input/output module 1810 is configured to connect to a plurality of devices, such as an input device 1814 (e.g., input device 216) and/or an output device 1816 (e.g., output device 214). Example input devices 1814 include a stylus, a finger, a keyboard and a pointing device, e.g., a mouse or a trackball, by which a user can provide input to the computer system 1800. Other kinds of input devices 1814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1816 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 1816 may comprise appropriate circuitry for driving the output device 1816 to present graphical and other information to a user.

According to one aspect of the present disclosure, the client 110 and server 130 can be implemented using a computer system 1800 in response to processor 1802 executing one or more sequences of one or more instructions contained in memory 1804. Such instructions may be read into memory 1804 from another machine-readable medium, such as data storage device 1806. Execution of the sequences of instructions contained in main memory 1804 causes processor 1802 to perform the process steps described herein. One or more processors in a multi-processing arrangement may also be employed to execute the sequences of instructions contained in memory 1804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 1800 can include clients and servers. A client and server are generally remote from each other and typically interact through a communication network. The relationship of client and server arises by virtue of computer programs running on the respective computers and having a client-server relationship to each other. Computer system 1800 can be, for example, and without limitation, a desktop computer, laptop computer, or tablet computer. Computer system 1800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 1802 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 1806. Volatile media include dynamic memory, such as memory 1804. Transmission media include coaxial cables, copper wire, and fiber optics, including the wires that comprise bus 1808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 1808. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for providing a platform discovery and deployment automation system, the method comprising: identifying, by one or more processors, available platforms associated with a platform discovery and deployment system; determining, by the one or more processors, if an application or service is running on each available platform; setting, by the one or more processors, a version field to display at least one of a version number for each running application or service and a blank for each application or service not running on each available platform; querying, by the one or more processors, a version number associated with a first application or service if the first application or service is running on one or more of the available platforms; obtaining, by the one or more processors, a version number value associated with the first application or service; storing, by the one or more processors, the version number value in a version number database; displaying, by the one or more processors, a single pane of glass interface; displaying, by the one or more processors, the version number value associated with a listing of the first application or service on the single pane of glass interface; and performing the determining, querying, obtaining, storing and displaying steps for all the identified available platforms wherein performance of the querying, obtaining, storing, and displaying steps is based on the determining step identifying one or more applications or services running on the available platforms.

2. The method of claim 1, further comprising:
reiterating one or more of the determining, querying, obtaining, storing and displaying steps for each application or service running on each available platform.

3. The method of claim 1, wherein each deployed application or service running on an available platform exposes an associated version number as an endpoint.

4. The method of claim 1, wherein a list of versions of applications and services running on an available platform is stored as a dictionary with the available platform name as a key.

5. The method of claim 1, wherein the single pane of glass interface displays version of all deployed applications and services on all available platforms.

6. The method of claim 1, wherein an update element is displayed adjacent the first application or service on the single pane of glass interface.

7. The method of claim 6, further comprising:
determining an activation of the update element;
querying a docker registry;
obtaining a list of stored image versions;
determining a selection of a first image version from the list of stored image versions;
determining a selection of an available platform; and
deploying the first image version to the selected available platform.

8. The method of claim 7, further comprising:
determining a selection that the application or service associated with the first image version needs to be monitored.

9. The method of claim 7, further comprising:
configuring any of docker secrets, labels and flags to be associated with the deployed first image version.

10. The method of claim 7, further comprising:
invoking a container management application, wherein the container management application executes the deployment of the first image version to the selected available platform.

11. The method of claim 7, further comprising:
determining successful deployment of the first image version; and
displaying, on the single pane of glass interface, a new version number of the application or service associated with the first image version.

12. The method of claim 7, further comprising:
determining, for the application or service associated with the first image version, which docker secrets are needed, which additional java/docker parameters are needed, and which overlay network the deployment should be on.

13. The method of claim 7, further comprising:
authenticating a user prior to one of providing the user access to the list of stored image versions and deploying the first image version selected by the user.

14. The method of claim 1, wherein each available platform has its own platform discovery and deployment automation container configured to keep track of all applications and services that are deployed within that platform and to facilitate deployments to that platform.

15. A platform discovery and deployment automation system, comprising: a memory; and a processor configured to execute instructions which, when executed, cause the processor to: identify available platforms associated with a platform discovery and deployment system; determine all applications and services running on a ll available platforms; query a version number associated with each determined application or service; obtain a version number value associated with the queried version number; store each version number value in a version number database; display a single pane of glass interface; and monitor, in the single pane of glass interface, listings of all determined applications and services, each listing including the application or service name, the current version number, and an update button; display, in the single pane of glass interface, a version field to display at least one of the version number for each listing of the determined applications and services and a blank for each listing of an application or service not running on each available platform; and deploy, in response to the update buttons of each listing, updated versions of applications or services according to a current state of the application or service in each particular platform.

16. The system of claim 15, further comprising instructions that cause the processor to:
   determine an activation of a first update button;
   query a docker registry;
   obtain a list of stored image versions;
   determine a selection of a first image version from the list of stored image versions;
   determine if the application or service associated with the first image version is to be monitored;
   determine a selection of an available platform; and
   deploy the first image version to the selected available platform.

17. The system of claim 16, further comprising instructions that cause the processor to:
   configure docker secrets, labels and flags to be associated with the first image version; and
   determine, for the application or service associated with the first image version, which docker secrets are needed, which additional java/docker parameters are needed, and which overlay network the deployment should be on.

18. The system of claim 16, further comprising instructions that cause the processor to:
   invoke a container management application, wherein the container management application deploys the first image version to the selected available platform;
   determine successful deployment of the first image version; and
   displaying, on the single pane of glass interface, a new version number of the application or service associated with the first image version.

19. The system of claim 16, further comprising instructions that cause the processor to:
   provide each available platform with its own platform discovery and deployment automation container configured to keep track of all applications and services that are deployed within that platform and to facilitate deployments to that platform.

* * * * *